United States Patent [19]

Bühlmann et al.

[11] Patent Number: 4,858,292
[45] Date of Patent: Aug. 22, 1989

[54] CONTROLLED DEFLECTION ROLL

[75] Inventors: Eugen T. Bühlmann, Gossau, Switzerland; Mario Biondetti, Venice, Italy; Wolf-Gunter Stotz, Ravensburg, Fed. Rep. of Germany

[73] Assignee: Sulzer-Escher Wyss AG, Zurich, Switzerland

[21] Appl. No.: 164,699

[22] Filed: Mar. 7, 1988

[30] Foreign Application Priority Data

Mar. 10, 1987 [CH] Switzerland ............... 00879/87

[51] Int. Cl.⁴ .................................. B21B 27/00
[52] U.S. Cl. ............................ 29/116.2; 29/116.1; 29/129.5; 72/245
[58] Field of Search ........... 29/116.2, 116.1, 129.5, 29/110; 72/245; 384/114, 118, 119

[56] References Cited

U.S. PATENT DOCUMENTS 3,846,883 11/1974 Biondetti ................... 29/116.2
4,404,724 9/1983 Christ et al. ................ 384/119
4,472,865 9/1984 Schiel et al. ................ 29/116.2

Primary Examiner—Howard N. Goldberg
Assistant Examiner—Irene Cuda
Attorney, Agent, or Firm—Werner W. Kleeman

[57] ABSTRACT

The controlled deflection roll comprises a rotatable roll shell supported at a stationary support member by means of a plurality of hydrostatic pressure elements. The hydrostatic pressure elements are sealingly movably guided by guide structure, for example, bores, which define cylinder chambers. Each cylinder chamber is connected by a feed system comprising a feed channel to a source of a hydraulic pressure medium. Between each feed channel and the related hydrostatic pressure element, there is arranged a damping body provided with at least one throttle location, for example throttle bores, through which the hydraulic pressure medium can flow. The damping body defines essentially the only connection between the feed channel and the cylinder chamber. Possibly occurring oscillations or vibrations of the rotatable roll shell relative to the stationary support member are damped by these damping bodies and, accordingly, transmission of such oscillations or vibrations to the hydraulic pressure medium feed system is prevented.

24 Claims, 6 Drawing Sheets

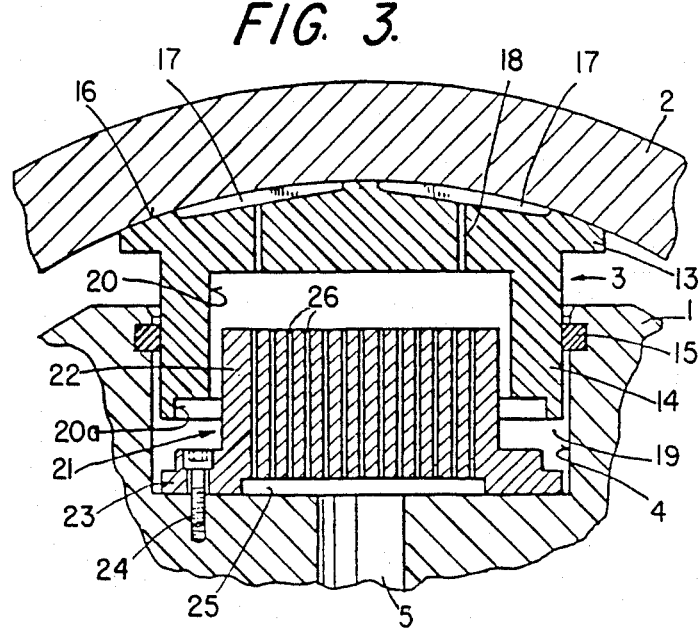

CONTROLLED DEFLECTION ROLL

BACKGROUND OF THE INVENTION

The present invention relates to a new and improved construction of a controlled deflection roll, also known in the art as a flexure adjusting roll or a roll with bending or sag compensation.

Generally speaking, the controlled deflection roll of the present development is of the type comprising a stationary support member or beam, a rotatable tubular roll shell which can be rotated about the stationary support member or beam and a plurality of hydrostatic pressure or support elements disposed between the rotatable tubular roll shell and the stationary support member or beam. These hydraulic pressure or support elements serve to support the rotatable tubular roll shell by means of a bearing surface and are sealingly movably guided transversely to the lengthwise axis of the stationary support member or beam by means of cylinder-piston guide systems or structure provided at the stationary support member or beam. The hydraulic pressure elements together with the cylinder-piston guide systems or structure define hydraulic pressure chambers, each of which is connected via at least one bore with the bearing surface and each hydraulic pressure chamber is also in flow connection or communication with a hydraulic pressure medium feed channel or conduit provided at the stationary support member or beam.

Controlled deflection rolls of the above-mentioned type are disclosed, for example, in U.S. Pat. No. 3,802,044 granted Apr. 9, 1974 and U.S. Pat. No. 3,885,283 granted May 27, 1975. In these described arrangements, the roll shell is either only supported by a plurality of pressure or support elements or, additionally, is supported at its ends by anti-friction or roller bearings. The pressure elements each comprise at least one hydrostatic bearing pocket in the area of the bearing surface. This hydrostatic bearing pocket is in flow communication or connection with the related cylinder or pressure chamber via at least one throttle bore extending through the pressure element. Through the throttle bores provided in the pressure elements, pressure fluid flows constantly from the stationary support member or beam in the direction of the roll shell, thus providing an elastic bearing or mounting of the roll shell at the stationary support member or beam. This, in turn, permits impulses acting upon the roll shell or the stationary support member or beam to be transformed into radial movement of these pressure elements in relation to each other.

By virtue of the throttle bores provided in the individual pressure elements, for some fields of application, it is possible to achieve sufficient damping of oscillations or vibrations occurring between the roll shell and the stationary support member or beam, whereby in particular, oscillations or vibrations of lower frequencies or larger amplitudes of the roll arrangement are damped. In many applications or for certain operating conditions in the presence of oscillations or vibrations occurring in a range of frequencies greater than, for example, 50 cycles per second, the damping of oscillations or vibrations can, however, be insufficient depending upon the construction and the dimensions of the roll arrangement, or else this damping effect is lost because the elasticity of the hydraulic pressure medium or that of the required feed or supply lines is essentially too great.

SUMMARY OF THE INVENTION

Therefore, with the foregoing in mind, it is a primary object of the present invention to provide a new and improved construction of a controlled deflection roll which does not exhibit the aforementioned drawbacks and limitations of the prior art constructions.

Another important and more specific object of the present invention aims at providing a new and improved construction of a controlled deflection roll by means of which an effective and optimum damping of oscillations or vibrations of the roll shell is also ensured in the range of higher frequencies or lower spurious or interfering amplitudes.

Now in order to implement these and still further objects of the invention, which will become more readily apparent as the description proceeds, the controlled deflection roll of the present development is manifested by the features that at least one oscillation damping means, such as at least one oscillation damping throttle location is provided between the feed or supply channel for the hydraulic pressure medium provided in the stationary support member or beam and the associated hydraulic pressure chamber along the flow path of the hydraulic pressure medium.

In this connection, it is noted that the at least one oscillation damping throttle element may be arranged at a location directly between the feed or supply channel and the associated hydraulic pressure chamber or between the feed or supply channel and an intermediately disposed pressure chamber which itself is located within the first mentioned hydraulic pressure chamber and such throttle element is disposed along the flow path of the hydraulic pressure medium. Also combinations of such arrangements are possible.

The throttle locations are structured or designed such that the kinetic energy or momentum of the hydraulic pressure medium is absorbed by means of friction at the walls of the throttle locations or by generating turbulence and finally is converted into heat, whereby the desired damping of oscillations or vibrations is achieved. This can be effected, for example, in that connecting lines or conduits between the feed channel or conduit and the cylinder structure or the pressure chamber, respectively, are formed as throttle bores or channels, the length of which is appreciably larger than, i.e. is expedient or advantageous to provide a multiplicity of throttle bores or channels for the hydraulic pressure medium through which such flows simultaneously and in the same direction, in order to obtain an adequate total cross-sectional area and to thus ensure for a sufficient supply of the hydraulic pressure medium. Instead of the throttle bores or channels, there can be also provided in the feed or infeed channel or conduit throttle locations in the form of constrictions, necked-down portions and the like, which also beneficially cause an oscillation damping effect.

Both of these throttle locations collectively afford an effective damping action within a relatively broad frequency range of oscillations or vibrations. Correspondingly, the transfer of oscillations or vibrations to the mass of the hydraulic pressure medium contained in the feed or supply system is also reduced.

In a particularly advantageous and functionally reliable embodiment of the present invention, the throttle bore or channel or a plurality of such throttle bores or channels can be provided in an oscillation damping body which, for example, constitutes a structural part which can be mounted at the stationary support member or beam or the like.

A particularly compact embodiment can be achieved in that the hydraulic pressure or support element contains at the side facing the stationary support member or beam a recess or cavity suitable for receiving at least a part or portion of the damping body. As a result, the volume of the hydraulic pressure medium between the hydraulic pressure element and the stationary support member or beam can be kept as small as the mass of the hydraulic pressure medium directly supporting the hydraulic pressure element. In this manner, the elasticity of the hydraulic pressure medium which impedes damping in the feed channels or conduits is screened by the throttle bores or channels from the actual pressure chamber, and the damping effect of the capillary bores or channels is increased.

In order to accommodate the largest possible number of throttle bores or channels possessing a relatively large total flow cross-section or cross-sectional area in the smallest possible space according to a further aspect of the present invention, the damping body of the present invention can be provided with a pressure medium distribution channel which can be flow connected to the feed channel or conduit and which extends transversely to the lengthwise axis of the stationary support member or beam. Moreover, at least a part of the throttle bores or channels can be structured as branch or junction channels which are arranged transversely to this pressure medium distribution channel and extend or branch off essentially in radial direction from this pressure medium distribution channel.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings, there have been generally used the same reference characters to denote the same or analogous components and wherein:

FIG. 3 shows on an enlarged scale in relation to the illustration of FIG. 1 a partial sectional view of a second embodiment of a controlled deflection roll depicted similar to the controlled deflection roll shown in FIG. 2 and constructed according to the teachings of the present invention;

FIG. 4 shows on an enlarged scale in relation to the illustration of FIG. 1 a partial sectional view of a third embodiment of a controlled deflection roll constructed according to the teachings of the present invention;

DETAILED DESCRIPTION OF THE PREFERRED EMBODIMENTS

Describing now the drawings, it is to be understood that to simplify the showing thereof, only enough of the construction of the different embodiments of controlled deflection roll designed according to the teachings of the present invention have been illustrated therein as is needed to enable one skilled in the art to readily understand the underlying principles and concepts of the present development. Turning attention now specifically to FIG. 1 of the drawings, there has been depicted therein a rolling device or mill equipped with a controlled deflection roll 100 which cooperates or interacts with a conventional counter or back-up roll 10.

Figures 1, 2:
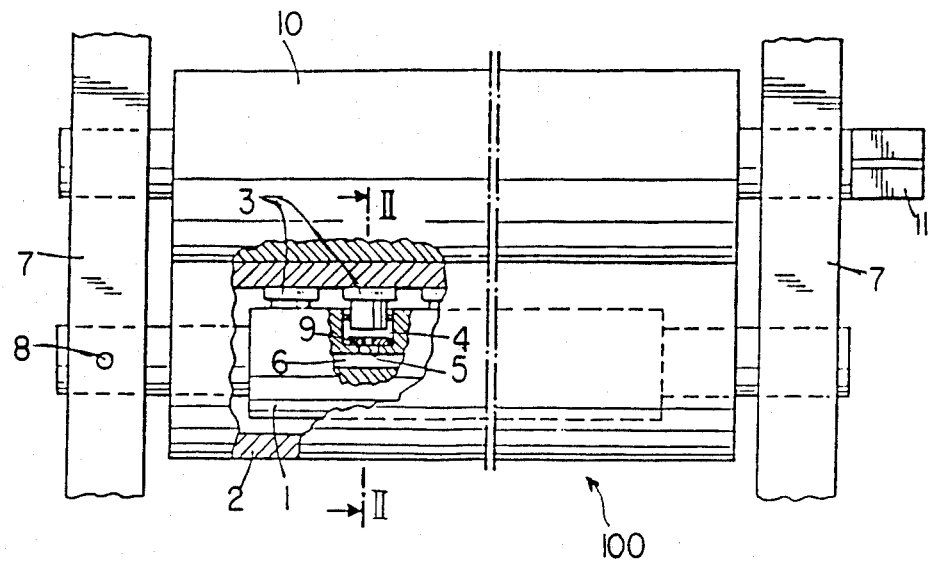
FIG. 1 shows a first embodiment of a controlled deflection roll constructed according to the teachings of the present invention and coacting with a counter or back-up roll and depicted in front and partially axial sectional view.
FIG. 2 shows on an enlarged scale in relation to the illustration of FIG. 1 a partial sectional view of the first embodiment of controlled deflection roll taken substantially along line II—II in FIG. 1.

The controlled deflection roll 100 comprises a stationary support member or beam 1—also referred to in the art sometimes as a yoke or shaft—and a substantially tubular roll shell or jacket 2 which is appropriately mounted to be rotatable about this stationary support member or beam 1. The tubular roll shell or jacket 2 is supported at the stationary support member or beam 1 by means of a plurality of piston-type hydraulic pressure or support elements 3 which are arranged in a row. These hydraulic pressure elements 3, which will be described in greater detail in connection with FIG. 2, are movably guided in bores or chambers 4 of the stationary support member or beam 1. These bores 4 are arranged transversely to the lengthwise axis of the stationary support member or beam 1. The bores 4 define pressure or cylinder chambers 19 which are connected by feed channels or conduits 5 and 6 disposed in the stationary support member or beam 1 to a suitable source of a hydraulic pressure or pressurized medium and which is not here particularly shown since such is well known in this technology.

The stationary support member or beam 1 is appropriately mounted at its ends in a supporting stand or frame structure 7 and secured against rotation, for example, by means of a bolt or pin member 8. The tubular roll shell or jacket 2 is pressed by the hydraulic pressure elements 3 against the counter or back-up roll 10 which is rotatably mounted at the roll or supporting stand or frame structure 7. This tubular roll shell or jacket 2 can be mounted at its ends by means of additional bearings at the stationary support member or beam 1 or, however, it can be supported and mounted solely by means of the hydraulic pressure elements 3 and is freely movable in the supporting or pressing direction. At one end of the counter or back-up roll 10, there are schematically depicted coupling surfaces or means 11 so that this counter or back-up roll 10 can be coupled to a suitable drive unit or drive not shown in the drawings. There can be provided in the roll or supporting stand or frame structure 7, further here not shown rolls such as, for example, stacked rolls of a calender in a papermaking machine. Such further rolls cooperate or interact via the counter or back-up roll 10 with the controlled deflection roll 100.

Each hydraulic pressure or support element 3 as particularly shown in FIG. 2 in detail, will be seen to comprise a head part or portion 13 which can be applied to or brought into contact with the inner surface of the tubular roll shell or jacket 2, and a shank part or portion 14 which is sealingly guided in the bore 4 by means of a suitable seal or sealing element 15. The seal or sealing element 15 also permits the hydraulic pressure element 3 to be appropriately inclined or tilted in the bore 4 which surrounds the shank part or portion 14 with a relatively large clearance or play. The head part or portion 13 possesses a running or bearing surface 16 in which there are formed hydrostatic bearing pockets 17. In the embodiment constructed according to the showing of FIG. 2, there can be provided several hydrostatic bearing pockets 17 which are connected in each case with the pressure or cylinder chamber 19 by an associated throttle bore or channel 18.

A damping body 9 is disposed in each bore or chamber 4 of the stationary support member or beam 1. As indicated in FIG. 2, the damping body 9 can possess a substantially plate-shaped configuration and can be suitably fastened to the stationary support member or beam 1 by means of threaded bolts or screws 24. In the damping body 9 there is provided a throttle bore or passage 27 which extends transversely with respect to the lengthwise axis of the pressure or cylinder chamber 19 is in flow connection with the feed channel or conduit 5. This throttle bore 27 can possess, for example, one or more cross-sectional restrictions or throats or can be provided with other types of damping elements such as diaphragms, channels, labyrinths or the like.

As shown in the modification of FIG. 3, the shank part or portion 14 of the hydraulic pressure or support element 3 can be provided with a central bore or chamber 20, which is in flow communication or connection via the throttle bores or channels 18 with the hydraulic bearing pockets 17. This central bore 20 possesses a widened or enlarged portion or section 20a on the side facing the stationary support member or beam 1. In accordance with the showing of FIG. 3, a damping body 21 can be disposed in the bore or chamber 4 of the stationary support member or beam 1. This damping body 21 comprises a head part or portion 22 which can be inserted into the central bore 20 of the hydraulic pressure element 3 as well as a seat part or portion 23 which can be mounted at the bottom or base of the bore or chamber 4 by means of threaded bolts or screws 24.

The seat part or portion 23 is here shown provided with a distribution chamber 25 into which the feed channel or conduit 5 discharges. This distribution chamber 25 is connected with the central bore 20 of the hydraulic pressure element 3 by several throttle bores or channels 26 distributed across the cross-section of the head part or portion 22.

The hydraulic pressure element 3 is positionally adjustable between a rest position in which the head part or portion 13 rests on or is supported by the stationary support member or beam 1, and an operating or working position corresponding substantially with the position depicted in FIGS. 2 and 3. The bores 20 and enlarged or widened portions 20a and the damping body 9 or 21, as the case may be, are of such a size or dimension that the hydraulic pressure element 3 for each stroke or displaced position thereof together with the associated damping body 9 or 21 bounds or delimits a cross-section or cross-sectional area through which the hydraulic pressure medium can freely flow. Accordingly, the reliable impacting of all the piston-type surface portions of the hydraulic pressure element 3 by the hydraulic pressure medium which is infed via the feed channel or conduit 5 and the throttle bore 27 (FIG. 2) or the throttle bores 26 (FIG. 3) is ensured.

The throttle bore or passage or channel 27 of the embodiment according to FIG. 2 and the number and diameter of the throttle bores or channels 26 of the embodiment depicted in FIG. 3 are so dimensioned or determined that, on the one hand, an adequate damping can be achieved and, on the other hand, a sufficiently large flow cross-section or cross-sectional area is available. This ensures for the required supply of the hydraulic pressure medium in order to lift the tubular roll shell or jacket 2 within a predetermined time interval and which also ensures, in particular, for example in case of an operational disturbance or breakdown, a return flow of the hydraulic pressure medium in a split second for achieving rapid lowering of the tubular roll shell or jacket 2. Thus, the damping body 9 or 21, as the case may be, can contain a relatively large number of thin or fine throttle bores or channels 27 or 26, respectively.

According to the illustration of FIG. 3, the widened or enlarged section or portion 20a of the central bore 20 of the hydrostatic pressure element 3 can be adapted to the form of the seat part or portion 23 of the damping body 21, so that the volume of the parts or portions of the pressure or cylinder chamber 19 impacted by the hydrostatic pressure medium and defined or bounded by the hydrostatic pressure element 3 and the damping body 21 can be kept as small as possible.

FIG. 4 shows an arrangement comprising a multi-part damping body 31 which comprises a substantially cylindrical distribution or distributor piece or element 33 which is substantially centrally arranged relative to the hydraulic pressure element 3. This substantially cylindrical distribution or distributor piece or element 33 is provided with a base or bottom plate 32.

The multi-part damping body 31 also comprises two substantially ring-shaped or annular distribution or distributor discs 34 which are mounted or inserted on the substantially cylindrical distribution piece or element 33, an intermediate or adapter disc 35 which is arranged between the two substantially ring-shaped or annular distribution discs 34, a spacing or spacer disc 36 which can be placed upon the upper substantially ring-shaped or annular distribution disc 34 and a fixing or holder disc 37 which can be threaded or screwed together with the upper end of the substantially cylindrical distribution piece or element 33. The substantially ring-shaped or annular distribution or distributor discs 34, the intermediate or adapter disc 35 and the spacing or spacer disc 36, assembled together to form a package or a structural stack, are pressed against the base or bottom plate 32 by the fixing or holder disc 37. The substantially cylindrical distribution piece or element 33 can be mounted at the stationary support member or beam 1 by means of a threaded pin or plug 33a or equivalent structure which can be screwed into the feed channel or conduit 5 and secured against rotation by an anchor or locking screw 38 or the like.

The substantially cylindrical distribution or distributor piece or element 33 is provided with a central pressure medium distribution or distributor channel 40 which is open towards the feed channel or conduit 5 and is in flow connection by means of adjacently situated radial branch channels 41 and 42 with two groove-like ring or annular channels 43 and 44 formed at the circumference of the substantially cylindrical distribution piece or element 33. These ring or ring-shaped channels 43 and 44 can each be connected to one single branch channel or to several branch channels 41 and 42, for example, to four branch channels 41 or 42 as shown in the sectional view of FIG. 5.

Figure 5:
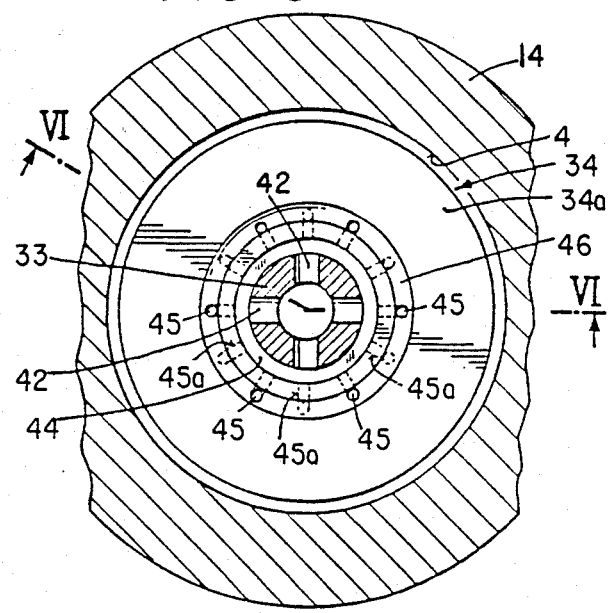
FIG. 5 shows on an enlarged scale in relation to the illustration of FIG. 4 a partial sectional view of the controlled deflection roll of FIG. 4 taken substantially along the line V—V thereof.
Figure 6:
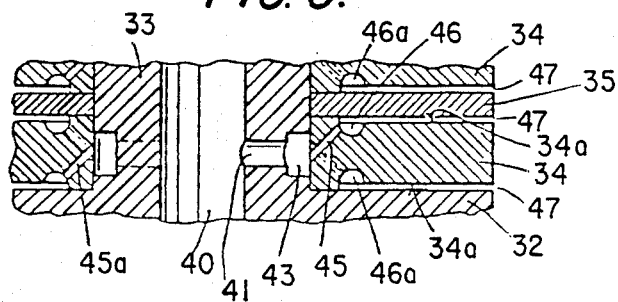
FIG. 6 shows on an enlarged scale in relation to the illustration of FIG. 4 a detail of the controlled deflection roll of such FIG. 4 and taken substantially along the line VI—VI in FIG. 5.

As particularly depicted in FIGS. 5 and 6, each of the ring channels 43 and 44 is connected by junction or connection channels 45 and 45a disposed diagonally and radially in the ring-shaped or annular distribution discs 34 with two ring or ring-shaped grooves 46 and 46a which are each formed at one of the ring-shaped or annular distribution discs 34. Each of these ring or ring-shaped grooves 46 and 46a defines together with its adjacent part or portion of the damping body 31, a collecting channel for the hydraulic pressure medium supplied through the junction or connection channels 45 and 45a, and such adjacent part or portion of the damping body 31 can be constituted by the base or bottom plate 32, the intermediate or adapter disc 35 or the spacing disc 36, as the case may be.

The ring or ring-shaped grooves 46 and 46a, as the case may be, are each inwardly closed by the ring or annular surfaces of the ring-shaped or annular distribution discs 34, the base or bottom plate 32, the intermediate or adapter disc 35 or the spacing disc or spacer 36, and these ring or annular surfaces are firmly pressed together in the area of the inner circumference of the ring or ring-shaped grooves 46 and 46a, As can be seen particularly well in FIGS. 4 and 6, the two ring or annular surfaces 34a of the ring-shaped or annular distribution or distributor disc 34, which are each adjacent to the outer circumference of the ring grooves 46 and 46a, respectively, can be disposed at such a spacing with respect to the opposing base or bottom plate 32, the intermediate or adapter disc 35 or the spacing disc 36, respectively, that between the ring surfaces 34a and the opposing surfaces there can be formed a ring-shaped throttle gap 47 through which the hydraulic pressure medium can radially flow.

As a result of this arrangement, the hydraulic pressure medium is transported into the pressure or cylinder chamber 19 provided at the stationary support member or beam 1 via the two ring or ring-shaped or annular channels 43 and 44 and the total of the four throttle gaps 47. The pressure or cylinder chambers 19 are thus, with regard to oscillations or vibrations, substantially independent of the pressure medium supply or feed system and this is advantageously realized in a particularly simple, space-saving and effective manner.

Figure 7:
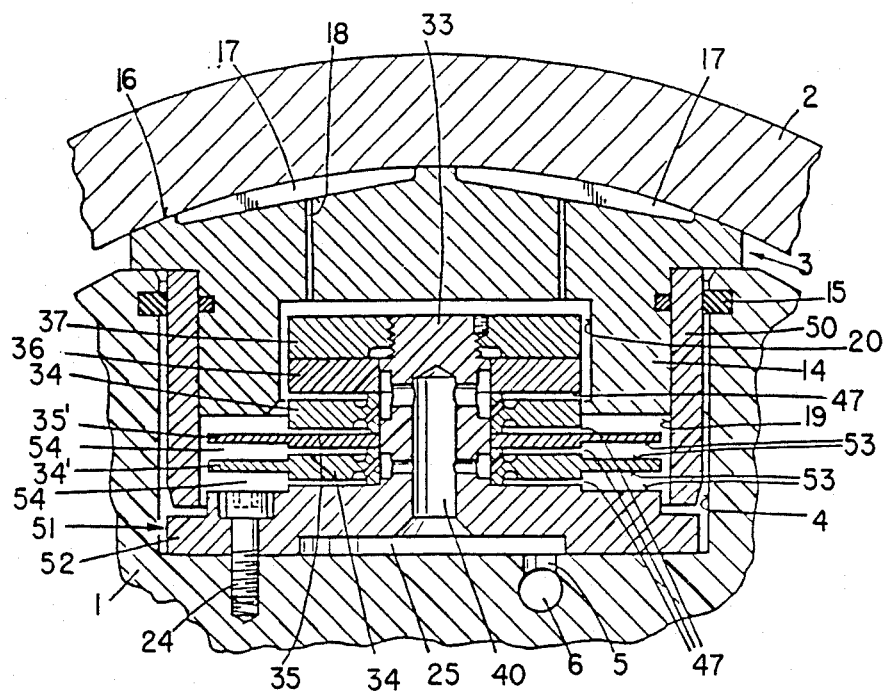
FIG. 7 shows on an enlarged scale in relation to FIG. 1 a partial sectional view of a fourth embodiment of a controlled deflection roll depicted similar to the controlled deflection roll shown in FIG. 4 and constructed according to the teachings of the present invention.

In the embodiment shown in FIG. 7, the hydraulic pressure or support element 3 is connected with a sleeve or tube member 50 which surrounds the shank part or portion 14 thereof, and together with this sleeve or tube member 50 is displaceably and inclineably guided in the bore or chamber 4 by the seal or sealing element 15. Accordingly, the shank part or portion 14 can be structured shorter than in the aforedescribed embodiments. In the substantially central bore 20, there is disposed a damping body 51 which is constructed similar to the damping body 31 according to FIG. 4. The substantially cylindrical distribution or distributor piece or element 33 of the damping body 51 is arranged at a base or bottom plate or plate member 52 which extends essentially across the full cross-section of the bore or chamber 4 and is mounted at the stationary support member or beam 1 by means of threaded bolts or screws 24 or the like. A distribution or distributor chamber 25 formed at the base or bottom plate 52 connects the feed or supply channel or conduit 5 with the control distribution channel 40. The substantially ring-shaped or annular distribution or distributor disc or disc member 34 resting on the base or bottom plate 52, and the intermediate or adapter disc or disc member 35 each comprise an edge or border or marginal portion 34' and 35' respectively, which extend and continue from the mean-radius circumferential zone, which is defined by the outer diameter of the upper ring-shaped or annular distribution disc 34 and the spacing or spacer disc or disc member 36 towards the inner circumference of the sleeve or tube member 50. These edge or border or marginal portions 34' and 35' serving as displacement bodies extend in close proximity to the inner circumference of the sleeve or tube member 50, thus leaving a relatively small slit or gap through which the hydraulic pressure medium can freely flow. The base or bottom plate 52 and the opposite surface of the neighboring lower edge or border portion 34', and the opposing or oppositely situated surfaces of the edge or border portions 34' and 35' each have a surface section or surface 53 which is stepped or recessed at the aforementioned mean-radius circumferential zone. Two opposing or oppositely situated surface sections or surfaces 53 define a stepped enlargement of the related throttle gap 47.

The volume of the pressure or cylinder chamber 19 and thereby the mass of the hydraulic pressure medium located between the damping body 51 and the hydraulic pressure or support or support element 3 is reduced by the edge or border or marginal portions 34' and 35', so that the elasticity of the filled hydraulic pressure medium can accordingly be reduced to such an extent that a firmer or more rigid but at the same time better oscillation damping support of the hydraulic pressure or support element 3 can be achieved.

In further modified exemplary embodiments of the present invention, the damping bodies can be assembled from a greater or lesser number of parts or components than the aforedescribed exemplary embodiments, and in such instance, a greater or smaller number of throttle bores or throttle gaps can be provided. Furthermore, exemplary embodiments are possible in which an arrangement, which has parts forming throttle gaps corresponding to the substantially ring-shaped or annular distribution or distributor discs 34 shown in FIGS. 4 to 7, comprises a number of throttle channels similar to the throttle bores depicted in FIG. 3 and which extend substantially parallel to the axis of the central distribution or distributor channel 40 and through, for example, the upper end of the substantially cylindrical distribution or distributor piece or element 33. Embodiments are also possible, in which the throttle channels are defined by bores branching off from a central distribution channel and corresponding with the branch channels 42 as shown in FIG. 4 and which lead directly into the pressure or cylinder chamber 19.

Figure 8:
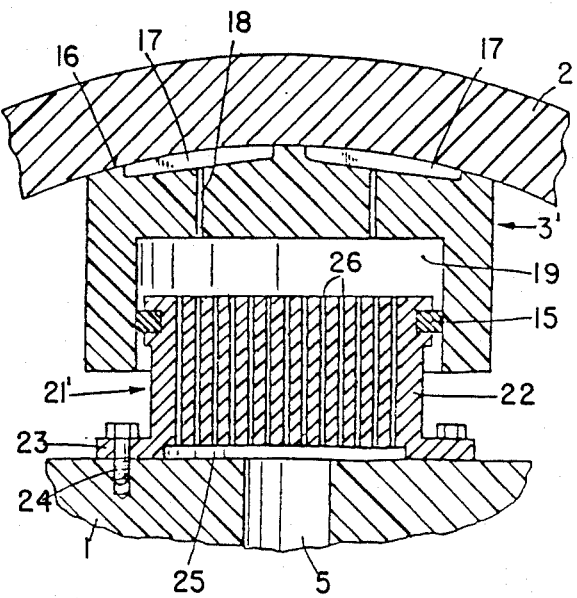
FIG. 8 shows on an enlarged scale in relation to FIG. 1 a partial sectional view of a fifth embodiment of a controlled deflection roll constructed according to the teachings of the present invention.

The invention can also be realized in connection with cylinder-type hydraulic pressure or support elements which, as described in the aforementioned U.S. Pat. No. 3,802,044, are sealingly guided by piston-type guide parts or components provided at the stationary support member or beam 1. According to the showing in FIG. 8, such a hydraulic pressure or support element 3' cooperates or interacts with a damping body 21' structured as a guide part or component, which carries the seal or sealing element 15 which is operatively associated with the inner surface of the hydraulic pressure element 3'.

It is to be understood that corresponding damping arrangements with throttle channels can be structured at an integral part or portion of the stationary support member or beam 1.

Figure 9:
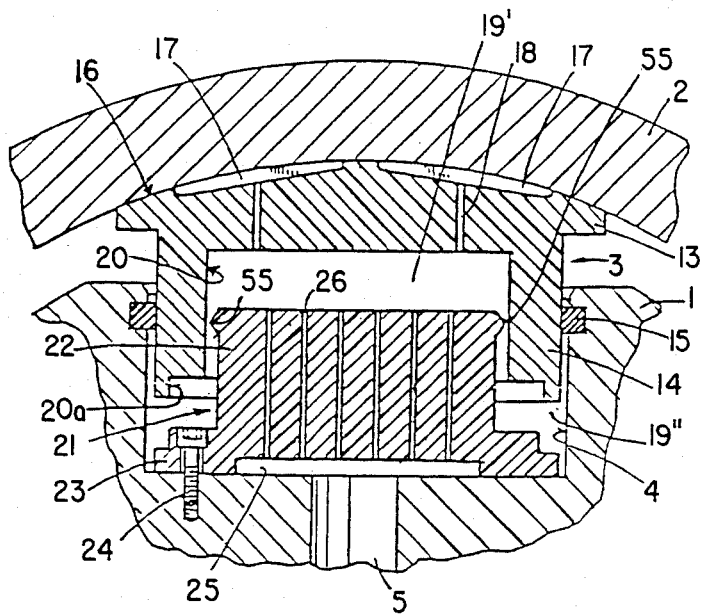
FIG. 9 shows on an enlarged scale in relation to FIG. 1 a partial sectional view of a sixth embodiment of a controlled deflection constructed according to the teachings of the present invention.

FIG. 9 shows a modified embodiment which differs from the embodiment according to FIG. 3 in that the head part or portion 22 of the damping body 21 is provided at is outer circumference or marginal region or edge with a substantially ring-shaped or annular web 55. The outer diameter of this substantially ring-shaped web 55 or equivalent structure is of such a size that it defines together with the substantially cylindrical inner surface of the substantially central bore 20, a substantially ring-shaped or annular throttle location by means of which an inner pressure chamber or chamber region or portion 19' of the pressure or cylinder chamber 19 is in flow communication or connection with an outer pressure chamber or chamber region 19'' of the pressure or cylinder chamber 19. An additional damping effect is achieved by this further throttle location 55 located between the chambers or chamber regions or portions 19' and 19''. In other words, the total damping of the system against oscillations or vibrations is further enhanced within a broad frequency band and amplitude range.

Figure 10:
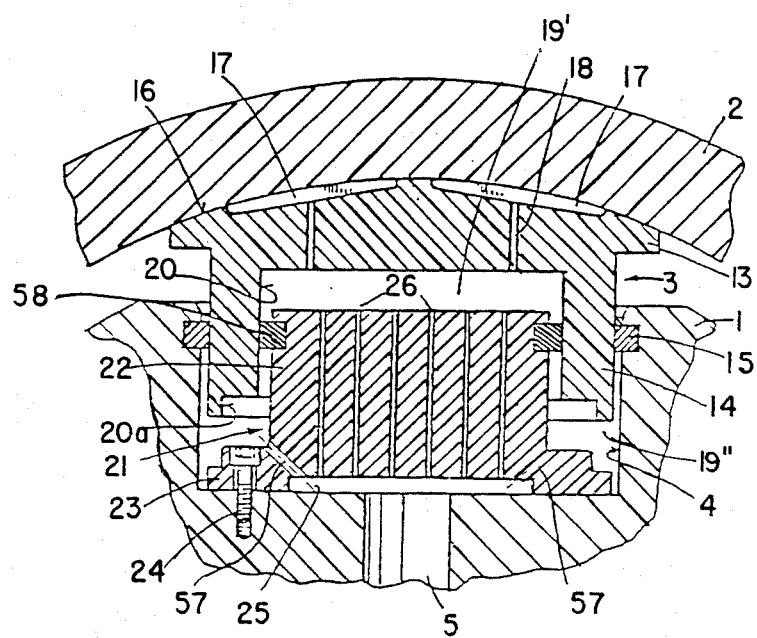
FIG. 10 shows on an enlarged scale in relation to FIG. 1 a partial sectional view of a seventh embodiment of a controlled deflection roll constructed according to the teachings of the present invention.

FIG. 10 shows a similar exemplary embodiment of the invention but which differs from the preceding embodiment in that the substantially ring-shaped outer pressure chamber or chamber region 19'' is connected by throttle channels 57 with the distribution or distributor chamber 25 adjacent to the feed or supply channel or conduit 5. Between the outer pressure chamber or chamber region 19'' and the inner pressure chamber 19' there are provided seals or sealing elements 58. An improved damping is also here achieved by the additional throttle channels 57.

In both preceding exemplary embodiments of the invention as illustrated in FIGS. 9 and 10, the number of substantially parallel throttle bores 26 can be smaller compared with the embodiment depicted in FIG. 3 and a larger cross-section of such substantially parallel throttle bores 26 can be selected. As a result, the slightly reduced damping of the throttle bores 26 can be compensated by the increased damping effect of the further throttle location or locations 55 or 57. Consequently, the totally achieved damping is still sufficient or adequate.

Figure 11:
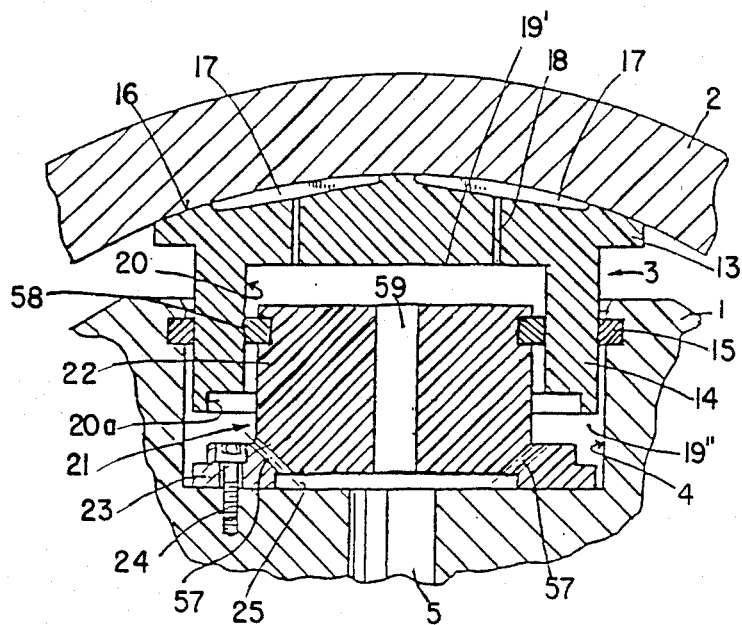
FIG. 11 shows on an enlarged scale in relation to FIG. 1 a partial sectional view of an eighth embodiment of a controlled deflection roll constructed according to the teachings of the present invention.

According to the showing of FIG. 11, only one single connection or bore 59 with less damping effect can be provided between the distribution or distributor chamber 25 and the inner pressure chamber or chamber region 19' in place of the plurality of throttle bores 26 in the damping body 21, provided that the throttle channels 57 between the distribution chamber 25 and the outer pressure chamber or chamber region 19'' are adequately structured with regard to the diameter-to-length relationship or ratio and a sufficient number of such throttle channels 57 is provided so that a sufficient damping effect is nonetheless achieved.

Figure 12:
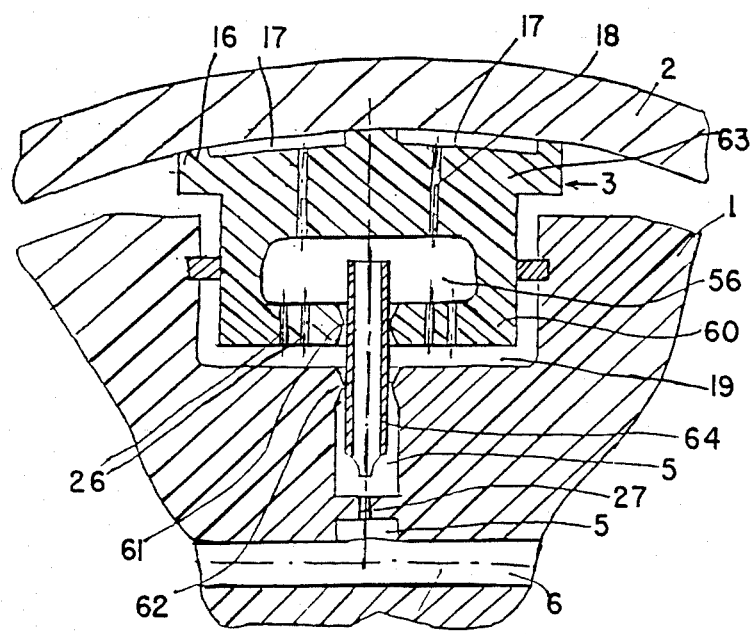
FIG. 12 shows on an enlarged scale in relation to FIG. 1 a partial sectional view of a ninth embodiment of a controlled deflection roll constructed according to the teachings of the present invention.

FIG. 12 shows an embodiment of the invention in which the damping body, instead of being fastened to the stationary support member or beam 1, forms a structural unit with the hydraulic pressure or support element 3 and thus defines the lower part or portion 60 of the hydraulic pressure element. The central or inner pressure chamber 56 here consists of a cavity or hollow space within the hydraulic pressure element 3 and which is located between the upper part or portion 63 and the lower part or portion 60. The central or inner pressure chamber 56 is connected, on one side, via throttle bores 18 with the hydraulic bearing pockets 17 and, on the other side, via further throttle bores 26 with the cylinder or pressure chamber 19. A displaceable substantially cylindrical sleeve or tube member 64 extends from the feed channel or conduit 5, which includes the throttle location or bore or channel 27 as known also from the arrangement of FIG. 2, through the cylinder or pressure chamber 19 and the lower part or portion 60 of the hydraulic pressure element 3 into the central or inner chamber 56. Ring-shaped throttle webs or web members 61 and 62 are provided at the stationary support member or beam 1 as well as at the lower part or portion 60 of the hydraulic pressure element 3. These throttle web members 61 and 62 form throttle locations which throttle the flow of the hydraulic pressure medium and exert a damping action or effect. The throttle locations comprising the throttle bores or channels 18, 26 and 27 and the substantially ring-shaped throttle webs or web members 61 and 62 collectively provide an optimum damping effect for each type of operation, i.e. during the upward movement or motion as well as during the downward movement or motion of the hydraulic pressure or support element 3, and in all cases, there are ensured full pressure and an adequate quantity of hydraulic pressure medium flowing into the pressure chambers and the hydraulic bearing pockets.

Furthermore, the damping is easily adjustable by replacing the sleeve or tube member 64 with one possessing other parameters, in particular, a different diameter and different flow cross-sectional area.

While there are shown and described present preferred embodiments of the invention, it is to be distinctly understood that the invention is not limited thereto, but may be otherwise variously embodied and practiced within the scope of the following claims.

Accordingly, what we claim is:

1. A controlled deflection roll comprising:
   a stationary support member;
   said stationary support member possessing a lengthwise axis;
   a substantially tubular roll shell rotatable about said stationary support member;

a plurality of hydrostatic pressure elements arranged between said stationary support member and said substantially tubular roll shell;

each hydrostatic pressure element possessing a bearing surface and at least one bore flow communicating with said bearing surface;

said plurality of hydrostatic pressure elements serving to support said substantially tubular roll shell by means of said bearing surfaces;

guide means provided at said stationary support member;

said plurality of hydrostatic pressure elements being sealing movably guided by said guide means transversely with respect to said lengthwise axis of said stationary support member;

said plurality of hydrostatic pressure elements together with said guide means defining hydraulic pressure chambers;

feed channel means provided in said stationary support member for delivering a hydraulic pressure medium to said hydraulic pressure chambers;

each of said hydraulic pressure chambers being in flow communication by means of said at least one bore of an associated hydrostatic pressure element located in such hydraulic pressure chamber with said bearing surface of the associated hydrostatic pressure element and each being in flow connection with said feed channel means; and means defining at least one oscillation damping throttle location provided in a flow path of said hydraulic pressure medium between said feed channel means and at least one predeterminate one of said hydraulic pressure chambers.

2. The controlled deflection roll as defined in claim 1, wherein:

said means defining at least one oscillation damping throttle location comprises a plurality of said means provided between said feed channel means and a plurality of said hydraulic pressure chambers for defining a plurality of said oscillation damping throttle locations.

3. The controlled deflection roll as defined in claim 1, wherein:

said means defining at least one oscillation damping throttle location comprises a plurality of said means provided between said feed channel means and each of said hydraulic pressure chambers for defining a plurality of said oscillation damping throttle locations.

4. The controlled deflection roll as defined in claim 1, wherein:

said means defining at least one oscillation damping throttle location is arranged between said feed channel means and an intermediately disposed pressure chamber within said hydraulic pressure chamber.

5. The controlled deflection roll as defined in claim 1, wherein:

said means defining at least one oscillation damping throttle location comprises a damping body provided with said at least one oscillation damping throttle location.

6. The controlled deflection roll as defined in claim 5, wherein:

said damping body comprises a structural part mounted at said stationary support member.

7. The controlled deflection roll as defined in claim 6, wherein:

said damping body comprises a plurality of throttle bores through which said hydraulic pressure medium can simultaneously flow and defining a plurality of oscillation damping throttle locations.

8. The controlled deflection roll as defined in claim 5, wherein:

said damping body comprises a plurality of throttle bores through which said hydraulic pressure medium can simultaneously flow and defining a plurality of oscillation damping throttle locations.

9. The controlled deflection roll as defined in claim 8, wherein:

said plurality of throttle bores extend through said damping body and are disposed substantially parallel to each other;

each of said throttle bores having a predeterminate diameter and a predeterminate length; and the predeterminate length of each said plurality of throttle bores being a multiple of the predeterminate diameter of each said throttle bore.

10. The controlled deflection roll as defined in claim 5, wherein:

each said hydraulic pressure element has a recess disposed at a side facing said stationary support member; and said recess being structured to receive at least a portion of said damping body such that said recess together with said portion of said damping body define a cross-sectional area through which said hydraulic pressure medium can freely flow.

11. The controlled deflection roll as defined in claim 10, wherein:

said recess of said hydraulic pressure element comprises a widened section which enlarges in the direction of said stationary support member;

said damping body being provided with displacement portion means insertable into said widened section;

said widened section having wall means which surround said displacement portion means; and said displacement portion means together with said wall portion means of said widened section delimiting a relative narrow gap through there can freely flow the hydraulic pressure medium.

12. The controlled deflection roll as defined in claim 8, wherein:

said damping body comprises a pressure medium distribution channel which can be connected to said feed channel means;

said pressure medium distribution channel being disposed transversely with respect to said lengthwise axis of said stationary support member; and at least part of said plurality of throttle bores being formed as connection channels arranged transversely to said pressure medium distribution channel and branching off essentially in radial direction from said pressure medium distribution channel.

13. The controlled deflection roll as defined in claim 12, wherein:

said damping body comprises at least one throttle gap which annularly encircles said pressure medium distribution channel;

said at least one throttle gap having an outer circumference; and said at least one throttle gap being open at said outer circumference and being in flow connection with said connection channels.

14. The controlled deflection roll as defined in claim 13, wherein:

said damping body comprises at least one collecting channel for said hydraulic pressure medium;

said collecting channel encircling said pressure medium distribution channel;

said at least one throttle gap being arranged in flow communication with said at least one collecting channel; and said connecting channels flow communicating with said at least one collecting channel and said at least one throttle gap.

15. The controlled deflection roll as defined in claim 12, wherein:

said pressure medium distribution channel has an axial direction;

said damping body comprises at least two partial elements disposed behind each other in said axial direction of said pressure medium distribution channel;

means for interconnecting said at least two partial elements; and said at least two partial elements defining therebetween a throttle gap.

16. The controlled deflection roll as defined in claim 15, wherein:

said at least two partial elements define at least two adjacently situated partial elements;

said connection channels being arranged in one of said at least two adjacently situated partial elements;

at least one of said at least two adjacently situated partial elements comprising a disc member; and said disc member encircling said pressure medium distribution channel.

17. The controlled deflection roll as defined in claim 15, wherein:

at least one of said at least two partial elements of said damping body which bounds said throttle gap possesses a marginal portion having a cross-section which decreases outwardly in radial direction such that said throttle gap possesses a widening cross-sectional configuration.

18. The controlled deflection roll as defined in claim 1, wherein:

said means defining said at least one oscillation damping throttle location comprises web means forming restrictions for the flow of said hydraulic pressure medium.

19. The controlled deflection roll as defined in claim 5, further including:

means for dividing said hydraulic pressure chamber into two chamber portions; and means for flow connecting said two chamber portions with one another and defining at least one further oscillation damping throttle location.

20. The controlled deflection roll as defined in claim 19, wherein:

said damping body has an outer circumference;

said hydraulic pressure chamber has an inner wall; and said means defining said further oscillation damping throttle location comprising a substantially ring-shaped web means disposed between said outer circumference of said damping body and said inner wall of said hydraulic pressure chamber.

21. The controlled deflection roll as defined in claim 19, wherein:

said means defining said further oscillation damping throttle location comprises an additional throttle bore arranged between said feed channel means and one of said two chamber portions.

22. The controlled deflection roll as defined in claim 1, wherein:

a predeterminate one of said plurality of hydrostatic pressure elements comprise an inner pressure chamber;

said at least one bore comprising a plurality of throttle bores flow communicating said inner pressure chamber with said bearing surface of said predeterminate one of said plurality of hydrostatic pressure elements;

an outer pressure chamber formed between said stationary support member and said predeterminate one of said plurality of hydrostatic support elements;

said means defining at least one oscillation damping throttle location comprising further throttle bores for flow communicating said outer pressure chamber with said inner pressure chamber; and said means defining said at least one oscillation damping throttle location further comprising a tube member for flow communicating said feed channel means with said inner pressure chamber.

23. The controlled deflection roll as defined in claim 22, wherein:

said tube member comprising an outer surface provided with web means defining restriction means; and said web means defining restriction means forming additional throttle locations between said feed channel means and said outer pressure chamber and between said outer pressure chamber and said inner pressure chamber.

24. A controlled deflection roll comprising:

a stationary support member;

said stationary support member possessing a lengthwise axis;

a shell rotatable about said stationary support member;

a plurality of pressure elements arranged between said stationary support member and said roll shell;

each pressure element possessing a bearing surface and at least one bore flow communicating with said bearing surface;

said plurality of pressure elements serving to support said roll shell by means of said bearing surfaces;

guide means provided at said stationary support member;

said plurality of pressure elements being sealing movably guided by said guide means transversely with respect to said lengthwise axis of said stationary support member;

said plurality of hydrostatic pressure elements together with said guide means defining hydraulic pressure chambers;

feed channel means provided in said stationary support member for delivering a hydraulic pressure medium to said pressure chambers;

each of said pressure chambers being in flow communication by means of said at least one bore of an associated pressure element located in such hydraulic pressure chamber with said bearing surface of the associated pressure element and each being in flow connection with said feed channel means; and means defining at least one oscillation damping throttle location provided in a flow path of said hydraulic pressure medium between said feed channel means and at least one predeterminate one of said hydraulic pressure chambers.

* * * * *

UNITED STATES PATENT AND TRADEMARK OFFICE
CERTIFICATE OF CORRECTION

PATENT NO. : 4,858,292

DATED : August 22, 1989

INVENTOR(S) : EUGEN THOMAS BüHLMANN et al

It is certified that error appears in the above-identified patent and that said Letters Patent is hereby corrected as shown below:

Column 2, line 49, after "i.e." please insert --larger by a multiple of, its diameter. In this connection, it--

Column 3, line 12, after "as small as" please insert --possible in order to keep as low as possible the elasticity of--

Column 5, line 47, after "axis of the" please insert --stationary support member or beam 1 and by means of which the--

Column 8, line 22, after "the" please delete "control" and insert --central--

Signed and Sealed this

Sixth Day of November, 1990

Attest:

HARRY F. MANBECK, JR.

*Attesting Officer*  *Commissioner of Patents and Trademarks*